United States Patent
Bastioli et al.

(10) Patent No.: US 9,951,218 B2
(45) Date of Patent: Apr. 24, 2018

(54) PLANT DERIVATIVES AS EXTENDER OILS AND BIOFILLERS IN ELASTOMERIC COMPOSITIONS

(71) Applicant: Novamont S.p.A., Novara (IT)

(72) Inventors: Catia Bastioli, Novara (IT); Luigi Capuzzi, Novara (IT); Paolo Magistrali, Novara (IT); Sebastia Gesti' Garcia, Turin (IT); Gian Tommaso Viola, Cervia (IT); Giuseppe Savini, Lugo (IT); Fabio Bacchelli, Cesenatico (IT)

(73) Assignee: NOVAMONT S.P.A., Novara (IT)

( * ) Notice: Subject to any disclaimer, the term of this patent is extended or adjusted under 35 U.S.C. 154(b) by 10 days.

(21) Appl. No.: 14/408,992

(22) PCT Filed: Jun. 18, 2013

(86) PCT No.: PCT/EP2013/062592
§ 371 (c)(1),
(2) Date: Dec. 18, 2014

(87) PCT Pub. No.: WO2013/189917
PCT Pub. Date: Dec. 27, 2013

(65) Prior Publication Data
US 2015/0376393 A1    Dec. 31, 2015

(30) Foreign Application Priority Data

Jun. 19, 2012 (IT) .............. MI2012A1067

(51) Int. Cl.
| | | |
|---|---|---|
| *C08L 47/00* | (2006.01) | |
| *C08K 5/10* | (2006.01) | |
| *C08L 9/06* | (2006.01) | |
| *C08L 21/00* | (2006.01) | |
| *B60C 1/00* | (2006.01) | |
| *C08K 5/54* | (2006.01) | |
| *C08L 3/04* | (2006.01) | |

(52) U.S. Cl.
CPC ............... *C08L 47/00* (2013.01); *B60C 1/00* (2013.01); *C08K 5/10* (2013.01); *C08L 9/06* (2013.01); *C08L 21/00* (2013.01); *C08K 5/54* (2013.01); *C08K 2201/014* (2013.01); *C08L 3/04* (2013.01); *C08L 2205/025* (2013.01)

(58) Field of Classification Search
CPC ......................... C08L 47/00; C08L 2205/025
See application file for complete search history.

(56) References Cited

U.S. PATENT DOCUMENTS 1,815,886 A    7/1931   Herman

FOREIGN PATENT DOCUMENTS

| EP | 0761734 A1 | 3/1997 | |
|---|---|---|---|
| EP | 1 384 600 A2 * | 1/2004 | ............... C08L 9/00 |
| EP | 1384600 A2 | 1/2004 | |
| EP | 1 621 579 * | 2/2006 | ............... C08L 29/04 |
| EP | 1621579 A1 | 2/2006 | |
| EP | 2 028 022 A1 * | 2/2009 | ............... C08K 5/10 |
| EP | 2028022 A1 | 2/2009 | |
| WO | WO 00/55236 * | 9/2000 | ............... C08G 63/85 |
| WO | WO-00/55236 A1 | 9/2000 | |
| WO | WO 2010/043813 A1 * | 4/2010 | ............... C08L 3/06 |
| WO | WO-2010/043813 A1 | 4/2010 | |

* cited by examiner

*Primary Examiner* — Robert Harlan
(74) *Attorney, Agent, or Firm* — Polsinelli PC

(57) ABSTRACT

The invention relates to elastomeric compositions containing plant derivatives as biofillers and vegetable oil derivatives acting as extender oils. In particular, one object of the invention are elastomeric compositions comprising at least one elastomer, at least one vegetable oil derivative, at least one biofiller of plant origin and at least one coupling agent.

19 Claims, No Drawings

PLANT DERIVATIVES AS EXTENDER OILS AND BIOFILLERS IN ELASTOMERIC COMPOSITIONS

CROSS REFERENCE TO RELATED APPLICATIONS

This application is a National Phase filing under 35 U.S.C. § 371 of PCT/EP2013/062592 filed on Jun. 18, 2013; and this application claims priority to Application No. MI2012A001067 filed in Italy on Jun. 19, 2012 under 35 U.S.C. § 119. The entire contents of each application are hereby incorporated by reference.

This invention relates to elastomeric compositions containing plant derivatives as biofillers and vegetable oil derivatives acting as extender oils.

During the processing of both synthetic and natural rubbers it is common practice to use extender oils and fillers during the compounding stage.

Extender oils, also defined as process oils, essentially have a plasticising effect and help to improve the workability of the rubber, reduce mixing times, minimise the quantity of heat generated and maximise the dispersion of components, at the same time increasing the cold elasticity and flexibility of vulcanised products without adverse effects on the most important physical properties.

Fillers are classified into inert or reinforcing fillers. In the case of inert fillers these can provide changes in the technological properties of vulcanised products, such as hardness and density, for example. In the case of reinforcing fillers these interact with the macromolecules, taking part in construction of the elastic network, and have effects on the dynamic and mechanical properties of vulcanised products.

Also, if used in significant quantities, extender oils and fillers extend the volume of the product, reducing its costs.

Typically used as extender oils are mineral oils derived from the processing of petroleum, which can be classified into paraffins (aliphatics), naphthenes (cycloaliphatics) and aromatics. In the processing of elastomers, in particular for the production of tyres, aromatic extracts known as DAE (Distillate Aromatic Extracts), which however contain polycyclic aromatic compounds (PCA) and in particular polyaromatic hydrocarbons (PAH), which are considered to be carcenogenic substances, are conventionally used.

Recent European legislation (Directive 2005/69/EC) however restricts the polyaromatic hydrocarbons content (PAH) of extender oils and tyres. One possible solution identified is to replace aromatic oils with aromatic and paraffin oils treated to reduce the polycyclic content, known respectively as TDAE (Treated Distillate Aromatic Extracts) and MES (Mild Extraction Solvates).

For example U.S. Pat. No. 6,984,687 (Goodyear) describes an elastomer composition containing 5 to 70 parts per weight (phr) of an extender oil characterised by a glass transition temperature of between −80 and −40° C., an aromatic polycyclic content of less than 3% and a total aromatics content which is in any event less than 20% by weight. Extender oils having a low PCA content described in that patent are MES and heavy naphthenic oils.

Another solution is represented by replacing mineral oils with oils of natural and renewable origin, in particular vegetable oils, and their derivatives. Examples of vegetable oils which may be used as extender oils in elastomer compositions are the mixtures of triglycerides containing complex oligomer structures described in patent application PCT/EP2011/073492.

As far as reinforcing fillers, such as carbon black or "white" fillers (like silica), which are commonly used in elastomer formulations, are concerned, these two may be at least partly replaced by fillers of renewable origin, and in particular of plant origin. In order to perform their function better these fillers of plant origin require coupling agents to be present in the formulation, as do the silicas. These coupling agents typically comprise organosilanes.

Goodyear patent application EP 1 544 243 describes elastomer compositions for tyres containing a combination of soya oil and a starch/plasticiser composite in the presence of carbon black and/or silica and a coupling agent. Such a combination makes it possible to achieve elastomer compositions having physical properties which are comparable to those of conventional elastomer compositions having extender oils of petroleum origin and carbon black.

This invention relates to elastomeric compositions containing particular vegetable oil derivatives as extender oils, together with specific quantities of biofiller. It has in fact been surprisingly discovered that it is possible to use a combination of these vegetable oil derivatives (even as a partial replacement for conventional extender oils for elastomers) and these biofillers (as a partial replacement for reinforcing fillers such as carbon black and silica), appreciably improving some mechanical properties and maintaining the other properties of the elastomer compositions substantially unchanged, with significant advantages not only from the economic point of view.

In particular, one object of this invention are elastomeric compositions comprising at least one elastomer, at least one vegetable oil derivative (A), at least one biofiller of plant origin (B) and at least one coupling agent (C), in which (A) is selected from one or more of the following groups:

A1) mixtures of triglycerides obtained from vegetable oils comprising one or more of the following oligomeric structures:

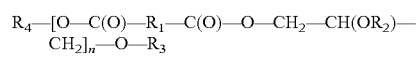

wherein
$R_1$ is selected from $C_2$-$C_{22}$ alkylenes,
$R_2$ is selected from one or more of the following groups consisting of $C_6$-$C_{24}$ dicarboxylic acid residues esterified with monoalcohols and $C_6$-$C_{24}$ monocarboxylic acid residues,
$R_3$ is selected from one or more of the following groups consisting of H, $C_6$-$C_{24}$ dicarboxylic acid residues esterified with monoalcohols and $C_6$-$C_{24}$ monocarboxylic acid residues,
$R_4$ is an alkyl group,
n is an integer equal to or greater than 2,
said mixtures of triglycerides having a Number Average Molecular Weight (Mn) of between 800 and 10,000 Da, A2) triglycerides of one or more long chain carboxylic acids comprising at least one carboxylic acid containing vicinal hydroxyl groups;

A3) polyol esters having at least one $C_6$-$C_{24}$ monocarboxylic acid and at least one $C_6$-$C_{24}$ dicarboxylic acid, these esters being different from the triglycerides;

(B) comprises starch complexed with polymers containing hydrophilic groups intercalated with hydrophobic sequences and present in quantities of between 1 and 50 parts per 100 parts of elastomer;

(C) comprises organosilanes.

The invention also relates to vulcanised products obtained from the said elastomer compositions.

By the term elastomer is meant natural rubbers (NR) as well as synthetic rubbers. Examples of synthetic rubbers are diene-based rubbers such as vinylarene-conjugated diene copolymers (e.g. SBR, Styrene/Butadiene Rubber), diene polymers (e.g. polybutadiene, isoprene), ethylene-propylene copolymers, in particular ethylene/propylene/diene terpolymers (EPDM, Ethylene/Propylene/Diene Monomer), and thermoplastic elastomers such as styrene-butadiene-styrene (SBS) block copolymers, polar nitrile rubbers, acrylonitrile-butadiene (NBR) copolymers and styrene-isoprene-styrene (SIS) rubbers.

The said elastomer may be used as such or in mixtures with other elastomers.

In a preferred embodiment the elastomer comprises natural rubbers or random vinylarene-conjugated diene copolymers.

Typical examples of vinylarenes are 2-vinyl naphthalene, 1-vinyl naphthalene, styrene and corresponding alkylated compounds. In the preferred embodiment the vinylarene is styrene.

The conjugated dienes are 1,3-dienes having 4 to 12 carbon atoms, preferably from 4 to 8 carbon atoms. Examples of these dienes are 1,3-butadiene, isoprene, 2,3-dimethyl-1,3-butadiene, 1,3-pentadiene (piperylene), 2-methyl-3-ethyl-1,3-butadiene, 1,3-octadiene. In the preferred embodiment the conjugated diene monomers are selected from 1,3-butadiene and isoprene, preferably 1,3-butadiene.

In the remainder of the description reference will be made to styrene as a typical vinylarene and to butadiene as a typical conjugated diene, without however being restricted to these compounds.

By the term "random styrene-butadiene copolymer" is meant styrene-butadiene copolymers in which the styrene content in the form of blocks constitutes 10% or less with respect to the bound styrene as measured by the oxidative decomposition method described by I. M. Kolthoff et al., J. Polymer Science, Vol. 1, page 429 (1946), or more recently by Viola et al. (Sequence distribution of styrene-butadiene copolymers by ozonolysis, high performance liquid chromatographic and gas chromatographic-mass spectrometric techniques, J. Chromatography A, 117 (1994)).

The above random styrene-butadiene copolymers have a styrene content of 15 to 50% by weight, preferably from 20 to 50% by weight.

As is known, butadiene can bind to the polymer chain as cis-1,4 bonds (cis bonds), trans-1,4 bonds (trans bonds) and 1,2 bonds (vinyl unit). The vinyl unit content is defined as the ratio between the quantity of vinyl units and the sum of cis, trans and vinyl bonds. The vinyl unit content of the diene portion of the random styrene-butadiene copolymer is preferably between 10 and 80%. The above vinyl unit concentration may be distributed uniformly along the polymer chain, and may increase or diminish along the chain.

Random conjugated styrene-butadiene copolymers may be obtained via two different processes: from solution or in emulsion.

As far as solution processes are concerned, these are preferably performed through anionic polymerisation initiated by lithium alkyls in hydrocarbon solvents. The Weight Average Molecular Weight (Mw) which can be measured by exclusion chromatography is between 50,000 and 1,000,000, with a molecular weight distribution (Mw/Mn) from 1 to 10. Preferably Mw is from 300,000 to 800,000 and Mw/Mn is from 1 to 5, more preferably from 1 to 3. The styrene-butadiene copolymers have a styrene content of between 15 and 50% by weight, preferably between 20 and 45% by weight, while the vinyl units content lies between 10 and 80% by weight, preferably between 20 and 70%. The molecular structure is linear or branched, the latter being obtained by causing the terminal active groups to react with coupling agents such as silicon tetrachloride, tin tetrachloride or other multi-functional group coupling agents according to the known art at the end of polymerisation. The Mooney viscosity of the polymer not extended with ML(1+4) oil @ 100° C. is from 30 to 200 Mooney Units (MU), preferably from 50 to 150, while the corresponding polymer extended with extender oils has a Mooney viscosity in the range 30-120 MU at 100° C.

As far as emulsion processes are concerned, these are preferably performed through free radical polymerisation; in this case the structure is branched because of transfer reactions on the molecular chain during the propagation stage. The quantity of styrene is between 20 and 50%, while the quantity of vinyl units is between 15 and 25% depending upon the synthesis temperature. The Mooney viscosity of the polymer extended with extender oils has values in the range 30-120 MU at 100° C.

With reference to component A), the vegetable oil derivatives according to this invention are characterised by relatively low molecular weight. Preferably the mean molecular weight lies below 10,000 g/mol. These vegetable oil derivatives are also characterised by high thermal and oxidative stability and stability to hydrolysis.

With reference to the A1 group, $R_1$ is preferably a $C_6$-$C_{11}$ alkylene, $C_6$, $C_7$ and/or $C_{11}$ alkylenes being particularly preferred. The two or more $R_1$ in the structure may be different from each other.

$R_2$ represents $C_6$-$C_{24}$ dicarboxylic acid residues or $C_6$-$C_{24}$ monocarboxylic acid residues or a mixture thereof. The two or more $R_2$ in the structure may differ from each other.

$R_3$ represents $C_6$-$C_{24}$ dicarboxylic acid residues or $C_6$-$C_{24}$ monocarboxylic acid residues.

When $R_2$ and/or $R_3$ represent $C_6$-$C_{24}$ dicarboxylic acid residues the free acid groups in the $C_6$-$C_{24}$ dicarboxylic acid residues are esterified with straight or branched $C_1$-$C_{12}$ monoalcohols.

Short chain monoalcohols such as for example methyl alcohol, ethyl alcohol, propyl alcohol and butyl alcohol are particularly preferred. Ethyl alcohol and butyl alcohol are particularly advantageous.

$R_4$ is preferably a straight or branched $C_1$-$C_{12}$ alkyl group, more preferably a $C_2$ or $C_4$ alkyl group.

In the case of group A1) of vegetable oil derivatives, by $C_6$-$C_{24}$ dicarboxylic acids are meant aliphatic diacids, preferably of the alpha-omega type. Suberic acid, azelaic acid, brassilic acid and their mixtures are particularly preferred.

In the case of group A1) of vegetable oil derivatives, by $C_6$-$C_{24}$ monocarboxylic acids are meant monoacids which may have one or more unsaturations along the chain, and which may or may not be substituted.

Preferred unsubstituted monocarboxylic acids are monoacids having a $C_{9-24}$ chain length; particularly preferred are palmitic, stearic, oleic, arachidic, behenic or lignoceric acids.

Preferred substituted monocarboxylic acids are long chain monocarboxylic acids with one or more ketone groups or hydroxyl groups in a non-terminal position, and among these $C_{12-24}$ carboxylic acids containing at least one ketone group or $C_{12}$-$C_{24}$ hydroxy acids containing at least one secondary hydroxyl group are particularly preferred. Examples of preferred substituted monocarboxylic acids are 9-hydroxystearic acid, 9-ketostearic acid, 10-ketostearic acid and 10-hydroxystearic acid.

These substituted monocarboxylic acids may contain two adjacent hydroxyl groups or one hydroxyl group adjacent to a ketone group. If two adjacent hydroxyl groups are present, dihydroxypalmitic, dihydroxystearic, dihydroxyoleic, dihydroxyarachidic and dihydroxybehenic acids are preferred; 9,10-dihydroxystearic acid is particularly preferred.

Advantageously the oligomer structures according to the invention are dimer or trimer esters of triglycerides in which the number of repeated units (n) is 2 or 3.

Dimer and trimer esters of triglycerides containing $C_6$-$C_{24}$ dicarboxylic acid residues are particularly preferred.
Examples of preferred dimer and trimer esters are illustrated by the following structures:
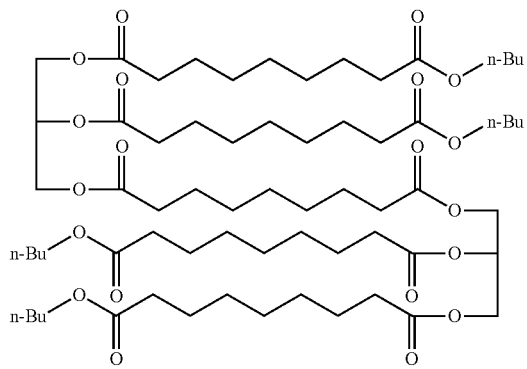
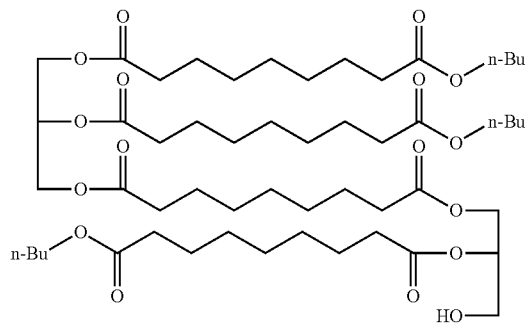
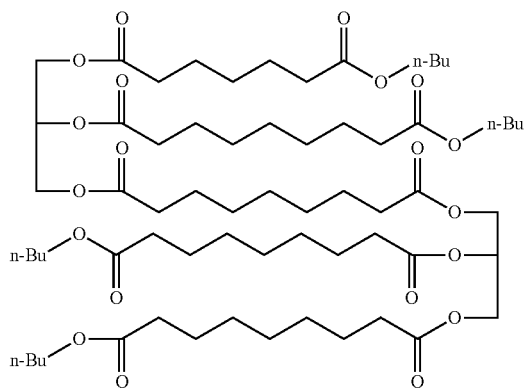
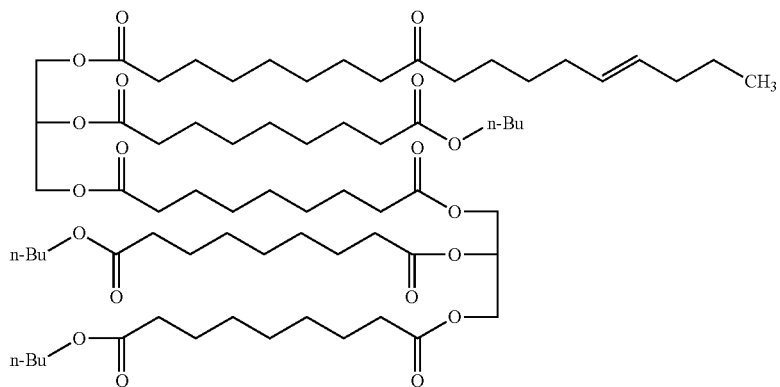
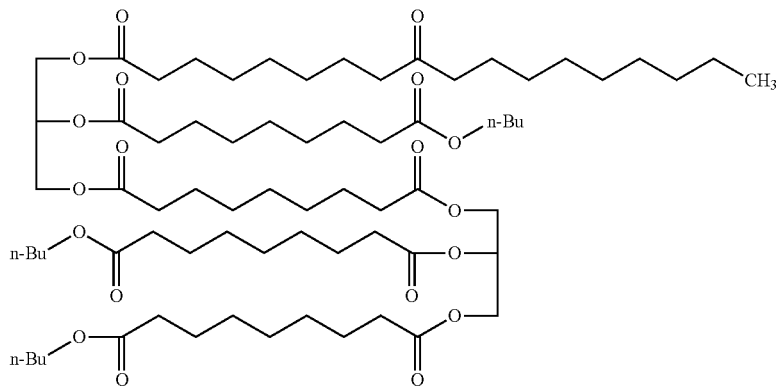

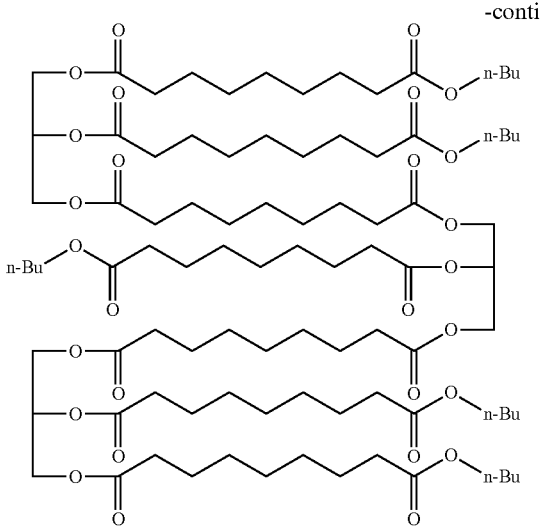

Other examples of oligomer structures according to the invention have $R_1=C_7$ alkylenes, $R_4=C_4$ alkyls, n=2 and $R_2$ and $R_3$ independently selected from the following groups:

—C(O)—(CH$_2$)$_{6\text{-}10}$—COOBu

—C(O)—(CH$_2$)$_{16}$—COOBu

—C(O)—(CH$_2$)$_{6\text{-}10}$—CH$_3$

—C(O)—(CH$_2$)$_{16}$—CH$_3$

—C(O)—(CH$_2$)$_{8\text{-}9}$—CO—(CH$_2$)$_{7\text{-}8}$—CH$_3$

—C(O)—(CH$_2$)$_6$—C—(CH$_2$)$_7$—CH=CH—CH$_3$.

The vegetable oil derivatives of group A1 according to this invention may contain monomer triglycerides containing at least one $C_6$-$C_{24}$ dicarboxylic acid residue. Monomer triglycerides containing two $C_6$-$C_{24}$ dicarboxylic acid residues, the said dicarboxylic acids being the same or different, are particularly preferred. Monomer triglycerides containing at least one $C_6$-$C_{24}$ dicarboxylic acid residue and at least one $C_6$-$C_{24}$ monocarboxylic acid residue having at least one ketone group and/or at least one hydroxyl group are also preferred. The carboxylic acid residues present in the said monomer triglycerides are esterified with straight or branched $C_1$-$C_{12}$ monoalcohols.

Preferably the triglyceride mixtures (group A1 of vegetable oil derivatives according to this invention) also contain oligoglycerols such as diglycerol and triglycerol and their esters with mono- or dicarboxylic acids. Esters of diglycerol and triglycerol comprising one or more $C_6$-$C_{24}$ dicarboxylic acids are preferred. Diglycerol and triglycerol esters comprising at least one saturated or unsaturated monocarboxylic acid containing one or more hydroxyl groups and/or a ketone group are also preferred.

The mixtures of triglycerides comprising one or more oligomer structures in group A1) of vegetable oils preferably have a Mn of between 800 and 5,000 Da, a kinematic viscosity of between 5 and 400 cSt at 100° C. and a glass transition temperature (Tg) of between −85° C. and −40° C., more preferably between −80° C. and −50° C. and even more preferably between −78° C. and −60° C. The Number Average Molecular Weight (Mn) is determined by GPC analysis after calibration with polystyrene standards.

Kinematic viscosity is calculated as the ratio between dynamic viscosity (measured at 100° C. using a HAAKE VT 500 rotational viscosity meter provided with an MV1 rotor) and density. The glass transition temperature (Tg) is determined by Differential Scanning Calorimetry in a single run from −100° C. to 30° C. with a rate of temperature change of 20° C./min.

The said triglyceride mixtures preferably have a density, determined by weighing 100 mL of the said mixtures at 100° C., of between 0.90 and 1.05 g/cm$^3$.

Advantageously the Acid Number of the mixtures is less than 50, preferably less than 10 and more preferably less than 5 mg KOH/g. By Acid Number is meant the quantity of KOH expressed in mg used to neutralise the acidity of 1 g of substance. The determination is performed according to standard ASTM D974-07 in the presence of phenolphthalein.

The degree of unsaturation of the triglyceride mixtures, expressed at the $I_2$ Number and determined by tritration according to the Wijs' method, is preferably between 0 and 140 g $I_2$/100 g.

The Saponification Number of the triglyceride mixtures, understood to be the quantity of KOH expressed in mg consumed in the saponification of 1 gram of substance, is preferably between 150 and 500 mg KOH/g. It is determined by titration of the residual KOH after reflux saponification for 60 minutes against HCl in the presence of phenolphthalein.

The Hydroxyl Number of the triglyceride mixtures preferably lies between 10 and 100 mg KOH/g. It is the number of mg of potassium hydroxide equivalent to the hydroxyl content of 1 g of substance.

The triglyceride mixtures comprising one or more oligomer structures of vegetable oils in group A1 are insoluble in boiling water. These mixtures are however completely soluble in diethylether, ethyl alcohol, acetone and chloroform at ambient temperature. They are also characterised by high stability to hydrolysis.

The triglyceride mixtures comprising one or more oligomer structures (group A1 of vegetable oil derivatives according to the invention) may be prepared as described in the international patent application entitled "Complex oligomeric structures" (PCT/EP2011/073492), the contents of that application being incorporated here as a reference.

With reference to group A2) of vegetable oil derivatives according to this invention (triglycerides of one or more long chain carboxylic acids comprising at least one carboxylic acid containing vicinal hydroxyl groups), the partial or total oxidation product of vegetable oils with $H_2O_2$ is particularly preferred. The derivatives obtained according to the processes described in patent applications WO/2008138892 and MI2009A002360 are considered by way of example. Sunflower oil derivatives and in particular of sunflower oil having a high oleic acid content (HOSO) are of particular interest.

With reference to group A3) of vegetable oil derivatives according to this invention (polyol esters with at least one $C_6$-$C_{24}$ monocarboxylic acid and at least one $C_6$-$C_{24}$ dicarboxylic acid, the said esters being different from the triglycerides), polyols such as neopentylglycol, trimethylolpropane and pentaerythritol and in any event polyols containing only primary hydroxyl groups are particularly preferred. Advantageously these esters contain monocarboxylic and dicarboxylic acids in ratios preferably between 2:1 and 10:1. The monocarboxylic acids have $C_8$-$C_{24}$ chains; the dicarboxylic acids have $C_6$-$C_{24}$ chains.

The vegetable oil derivatives according to this invention may be used as extender oils for elastomers as such, or mixed with mineral and/or natural oils. These mixtures preferably contain 15-45% by weight of vegetable oil derivatives. The mineral oils may be of the paraffin, naphthenic or aromatic type and their mixtures. Examples of mineral oils are DAE, TDAE and MES and RAE (Residual Aromatic Extract). By natural oils are meant all oils not derived from petroleum, of animal origin (for example whale and fish oil) and of plant origin. Among the natural oils, vegetable oils such as for example: peanut oil, Brassicaceae oils, hemp, safflower and coconut oils, sunflower oils having various oleic contents, Jatropha, linseed, olive, macadamia, mahua, neem, palm, poppyseed, pongamia, ricin and rice oils and oils from the seeds of the rubber tree (*Hevea brasiliensis*), maize, mustard, sesame and grape seed oils are particularly preferred.

Extender oils may be present in a mixture in a quantity of between 1 and 75 parts per 100 parts of rubber, preferably between 7 and 50 and more preferably between 10 and 40 parts of oil per 100 parts of rubber.

With reference to biofillers of plant origin (B) according to the invention, by the term biofiller is meant a mixture comprising starch complexed with polymers containing hydrophilic groups intercalated with hydrophobic sequences. By complexed starch is meant a starch which in the X-ray spectrometer has one or more crystalline forms which can be associated with one or more diffraction peaks as listed below:

| Crystalline form | VH (2θ) | VA (2θ) | EH (2θ) |
|---|---|---|---|
| | 7.4 (±0.3) | 7.7 (±0.3) | 7.0 (±0.2) |
| | 12.8 (±0.2) | 13.5 (±0.4) | 12.0 (±0.3) |
| | 16.7 (±0.2) | 15.7 (±0.1) | 13.1 (±0.3) |
| | 18.3 (±0.2) | 17.6 (±0.1) | 18.2 (±0.4) |
| | 19.7 (±0.3) | 19.3 (±0.2) | 24.9 (±0.2) |
| | 22.2 (±0.2) | 20.8 (±0.2) | |
| | 24.9 (±0.2) | 23.7 (±0.1) | |
| | | 26.4 (±0.1) | |
| | | 27.5 (±0.1) | |
| | | 28.6 (±0.1) | |

Preferably the complexed starch is destructured starch. In the meaning of this invention by destructured starch is meant a starch of any type treated in such a way that it has substantially lost its native granular structure. As far as the native granular structure of starch is concerned, this can advantageously be identified by phase contrast optical microscopy.

Starch is native starch, such as for example maize, potato, rice or tapioca starch, or starch which has been physically or chemically modified such as for example ethoxylated starch, starch acetate or starch hydroxypropylate, cross-linked starch, oxidised starch, dextrinised starch, dextrin and mixtures thereof.

As far as the polymers containing hydrophilic groups intercalated with hydrophobic sequences are concerned, these are preferably insoluble in water. These polymers are advantageously selected from:

copolymers of ethylene with vinyl alcohol, vinyl acetate, acrylic acid, methacrylic acid, crotonic acid, itaconic acid, maleic anhydride, glycidyl methacrylate and mixtures thereof;

vinyl acetate/vinyl alcohol copolymers;

6-6, 6-9 or 12 aliphatic polyamides, aliphatic polyurethanes, aliphatic and aliphatic/aromatic polyesters, random or block polyurethane/polyamide, polyurethane/polyether, polyurethane/polyester, polyamide/polyester, polyamide/polyether, polyester/polyether, polyurea/polyester, polyurea/polyether, polylactic acid, polyglycol acid, polycaprolactone/urethane random or block copolymers in which the molecular weight of the polycaprolactone blocks comprises between 300 and 3000.

Mixtures of the said polymers may also be used.

Of the polymers containing hydrophilic groups intercalated with hydrophobic sequences, those preferred are copolymers of ethylene with vinyl alcohol, vinyl acetate, acrylic acid, methacrylic acid, crotonic acid, itaconic acid, maleic anhydride and mixtures thereof.

Among these, copolymers of ethylene with vinyl alcohol and with acrylic acid are particularly preferred.

In the case of copolymers of ethylene with vinyl alcohol, these preferably contain 20-50% of ethylene units in moles.

In the case of ethylene copolymers with acrylic acid, these preferably contain 70-99% by weight of ethylene units.

One example of a biofiller of plant origin advantageously comprises the starch-based complexes described in patent EP 1127089 B1, incorporated here as a reference.

The products marketed by Novamont S.p.a. as MATER-BI 2030/3040 and MATER-BI 1128 RR may advantageously be used as biofillers according to this invention.

The biofillers of plant origin may be added to the elastomer composition during the compounding stage in the form of granules or in the form of a dispersion.

The use of such biofillers in elastomer compositions makes working of the material easier. It has in fact been observed that the use of these biofillers in the presence of a coupling agent favours the dispersion of reinforcing fillers comprising carbon black or mineral fillers, preferably but not exclusively precipitated silica.

In the case in which the chosen reinforcing filler is silica, any type of silica may be used, for example anhydrous silica obtained by precipitation from sodium silicate having a size in the range 20-80 nm and a surface area of 35-150 $m^2$/g. The quantity of silica is in the range of 10 to 150 phr, preferably from 15 to 120 phr.

It has been surprisingly observed that total or partial substitution of extender oil of fossil origin with vegetable oil derivatives according to this invention brings about a further improvement in mechanical and dynamic mechanical properties, with particular reference to lower rolling resistance, in the elastomer compositions in which a proportion of the reinforcing filler comprising carbon black or mineral fillers is replaced by biofiller.

In general vulcanised products containing minority proportions of biofiller together with reinforcing fillers comprising as a non-limiting example precipitated silica, in which the fraction by weight of total filler to the mixture is constant, have a lower compound Mooney viscosity, better elastic modulus values, better filler dispersion (as shown by the change in the rolling resistance predictor), an improving trend in ultimate tensile strength properties (ultimate tensile strength and elongation) and a decrease in density in comparison with mixtures containing reinforcing fillers alone.

This effect is found in compositions having quantities of biofiller between 1 and 50 parts per 100 parts of rubber, preferably between 3 and 40 parts per 100 parts of rubber and more preferably between 5 and 30 parts per 100 parts of rubber.

With reference to the coupling agent (C) according to the invention, the organosilanes commonly used in elastomer compositions in the presence of reinforcing fillers such as silica are meant. These have the function of stabilising a bond of a chemical or physical nature between the elastomer or the elastomers and the filler, improving dispersion of the latter and ensuring good mechanical properties for the elastomer compositions.

Typical organosilanes are trialkoxysilanes or a dialkoxysilane having functional groups. In the preferred embodiment the coupling agent has one of the three general formulae shown below (E, F, G):

  (E)

  (F)

  (G)

in which R represents an alkyl group having from 1 to 4 carbon atoms, the three R being the same or different from each other;
"n" represents a whole number from 1 to 6;
"m" represents a whole number from 1 to 6;
X represents a mercaptan group, an amine group, a vinyl group, a nitroso group, an imide group, a chlorine atom or an epoxy group;
Y represents a cyano group, a N,N-dimethyl thiocarbamoyl group, a mercaptobenzotriazole group or a methacrylate group.

Organosilanes having at least one sulfur atom are preferred, in particular because of their reactivity towards partly hydrogenated rubber during the vulcanisation stage. In particular organosilanes selected from bis(3-triethoxysilylpropyl) tetrasulfide, γ-mercaptopropyl methoxysilane; 3-thiocynatopropyl triethoxysilane; trimethoxysilyl propylmercapto-benzotriazole tetrasulfide are preferred in particular. The quantity of coupling agent lies in the range from 0.1 to 20 phr.

The elastomer composition forming the object of this invention may contain other fillers which may be either inert fillers or reinforcing fillers. Examples of inert fillers are kaolin, barytes, clay, talc, calcium and magnesium, iron and lead carbonates, aluminium hydroxide, diatomaceous earth, aluminium sulfate and barium sulfate.

Examples of reinforcing fillers are carbon black and silicas.

As far as carbon black is concerned, this is the usual carbon black used to reinforce elastomers. The quantity of carbon black lies in the range 10 to 150 phr, preferably from 10 to 100 phr, even more preferably from 15 to 80 phr. In the preferred embodiment the carbon black has a specific surface area determined by the nitrogen absorption method of between 40 and 150 m²/g and a DBP (dibutyl phthalate) absorption number determined according to ASTM-D-2414 of between 70 and 180 ml/100 g. It is preferable that the carbon black should be in the form of smaller particles having good oil absorption capacity. Even more preferable is a carbon black in which —OH groups have been introduced onto its surface, as these groups are reactive towards the organosilane coupling agent.

As far as the silica is concerned, any type of silica may be used, for example anhydrous silica obtained by precipitation from sodium silicate having a size in the range from 20-80 nm and a surface areas of 35-150 m²/g. The quantity of silica lies in the range from 10 to 150 phr, preferably from 15 to 120 phr.

Other reinforcing materials include inorganic compounds such as activated calcium carbonate or organic compounds such as resins having a high styrene content and phenol-formaldehyde resin. The abovementioned reinforcing materials may be present in quantities below 80 parts by weight per 100 parts of elastomer material.

According to one aspect of this invention the extender oil is added during industrial preparation of the elastomer. For example, in the case of elastomer copolymers obtained by anionic polymerisation in solution, the extender oil may be added to the polymer solution, preferably followed by additives such as antioxidants. Advantageously, at the end of anionic polymerisation in solution the solvent is removed in stirred steam-heated baths. In the case of elastomer copolymers obtained by free radical polymerisation the extender oils may advantageously be added to the aqueous emulsion, preferably followed by additives as usual, and by removal of the solvent after coagulation through the addition of sulfuric acid. The rubber is then dried by means of mechanical extruders or heated stoves and subsequently formed into balls.

According to another aspect of this invention the extender oil is added to the elastomer composition during the compounding stage.

During the compounding stage the following may be added to the elastomer in addition to the extender oil and fillers: vulcanising agents (e.g. sulfur) and accelerants, activators, vulcanisation retardants, organic acids, antioxidants, process coadjuvants and other additives, as known in the art.

As far as vulcanising agents are concerned, these are sulfur or a compound containing sulfur. Typical compounds containing sulfur are sulfur monochloride, sulfur dichloride, a disulfide, a polysulfide. The preferred vulcanising compound is sulfur. The quantity of vulcanising agent lies between 0.1 and 10 phr. A vulcanising accelerator, an activator and cross-linking agent may also be used together with the vulcanising agent. Vulcanising accelerators include guanidine, amine-aldehyde and ammonia-aldehyde derivatives, thiazol derivatives, amido sulfene compounds, thioureas, thiourams, dithiocarbamates and xanthates.

Typical activators are zinc oxide and stearic acid.

Typical examples of crosslinking agents include oxime derivatives, nitroso derivatives, polyamines, in addition to a free radical initiator such as an organic peroxide and an azo derivative.

As far as antioxidants or anti-ageing agents are concerned, these include amine derivatives such as disphenylamine and p-phenylenediamine, quinoline and hydroquinone derivatives, monophenols, diphenols, thiobisphenols, hindered phenols and esters of phosphoric acid.

These compounds and their corresponding mixtures may be used within the range from 0.001 to 10 parts by weight per 100 parts of elastomer material.

As far as the other materials are concerned, these are well known in the art and may be used according to requirements.

The elastomer composition according to the invention may be subsequently mixed, formed and vulcanised according to known methods.

The elastomer composition containing vegetable oil derivatives which is the subject matter of this invention finds application in the production of tyres in particular.

In accordance with what has been described above, one particular aspect of this invention relates to a crude elastomer composition comprising, making the total parts of elastomers (a1)+(a2) contained in the aforesaid composition equal to 100:
- (a1) from 30 to 90% by weight of a random vinylarene-conjugated diene elastomer copolymer;
- (a2) from 10 to 70% by weight, preferably from 20 to 60% by weight, of one or more diene rubbers;
- (b) from 10 to 150 phr, preferably from 15 to 120 phr, of silica;
- (c) from 1 to 50 phr, preferably from 5 to 30 phr, of a biofiller of plant origin comprising starch complexed with polymers containing hydrophilic groups intercalated with hydrophobic sequences;
- (d) from 1 to 50 phr of a vegetable oil derivative selected from one or more of groups A1, A2 or A3 according to this invention or their mixtures with other mineral and/or natural oils;
- (e) from 0.1 to 20 phr of a silane-based coupling agent;
- (f) from 0.1 to 10 phr of a vulcanising agent.

The elastomer composition of this invention may optionally also contain carbon black (g) in quantities from 10 to 150 phr.

The indication phr (parts per hundred parts by weight of rubber or elastomer) mentioned above corresponds to the normal way of expressing the composition of rubbers in the industry.

According to this particular aspect of this invention the random vinylarene-conjugated diene elastomer copolymer (a1) is preferably a styrene-butadiene copolymer. It has a Weight Average Molecular Weight ($M_w$) from 50,000 to 1,000,000 and a molecular weight distribution ($M_w/M_n$) from 1 to 10, preferably $M_w$ is from 300,000 to 800,000 and $M_w/M_n$ is from 1 to 5, more preferably from 1 to 3. The Mooney viscosity of the polymer not extended with $ML_{1+4}$ oil (100° C.) is from 30 to 200, preferably from 50 to 150, while the corresponding polymer extended with preferably non-aromatic extender oils has a Mooney viscosity within the range 30-120 at 100° C.

Again according to this aspect, the component (a2) of the composition according to this invention, that is the diene rubber, is an elastomer selected from the group comprising natural rubber, polybutadiene, polyisoprene, styrene-butadiene copolymer, styrene-isoprene copolymer and butadiene-isoprene copolymer. If polybutadiene is used as component (a2) it is preferable that this should be selected from cis-1,4 polybutadiene and high vinyl polybutadiene (vinyl content from 40% to 90%) and corresponding mixtures. If component (a2) is a polyisoprene it is preferable that this should be a cis-1,4 polyisoprene with a percentage of cis-1,4 of more than 90% by weight. Component (a2) with respect to the sum (a1)+(a2) lies within the range 10 to 70% by weight, preferably from 20 to 60% by weight.

As far as component (b) according to this particular aspect of this invention is concerned, that is the silica, any type of silica may be used.

The crude elastomer composition according to this invention may be prepared by mixing components (a)-(e), any carbon black and formulating agents using the typical equipment used for mixing elastomer compounds, for example roller mixing mills, Banbury internal mixers or extruders. The mixture is subsequently formed and then vulcanised. The ingredients may be mixed in a single stage or in various passes. In the latter case a first mixture comprises first mixing elastomer components (a1) and (a2), silica (b) and coupling agent (e) and any carbon black (g) and the other additives in a Banbury type internal mixer and then the vulcanising agents (f) and the accelerants in a roller mixer. In another method, again in stages, silica and the coupling agent are first mixed and caused to react and the product of this reaction is subsequently mixed with elastomers (a1) and (a2) and any carbon black, and finally with the vulcanising agent.

The elastomer composition according to the invention will now be described according to a non-limiting example.

Methods Used for Characterisation

Determination of Mooney Viscosity and ΔMooney

Determination of the Mooney viscosity of the mixture is performed at 100° C. with an L rotor and times (1+4) according to standard ASTM D1646.

The change in Mooney viscosity (ΔMooney) is defined as the difference between the Mooney viscosity of the mixture and the crude polymer. The change in Mooney viscosity as defined constitutes a system for evaluating the degree of dispersion of filler within the elastomer mixture; the better the dispersion the smaller the increase in Mooney viscosity.

Determination of Tensile Properties

Tensile strength (T.S.), elongation on breaking (E.B.) and moduli with reference to elongations of 100%, 200% and 300% (M 100%, M 200% and M 300% respectively) were determined according to standard ASTM D 412.

Determination of Dynamic Characteristics (tan δ):

The damping factor correlated to the rolling resistance (tan δ RR) was measured at 60° C., 5% deformation at a frequency of 1 Hz.

A relative value indicated as the Rolling Resistance Index is used below and defined as:

$$\text{R.R. index} = [100 - (\tan \delta_{sample}/\tan \delta_{reference}) \times 100$$

where the tan δ values are measured at 60° C., 5% deformation and 1 Hz.

EXAMPLES

Preparation of (Styrene-Butadiene Copolymer) Elastomers (A) Linear Styrene-Butadiene Copolymer Extended with TDAE Oil: Continuous Preparation The experiment was performed in two CSTR type reactors in series having a volume of 100 liters each used for copolymerisation, followed by a third reactor of 50 l to ensure almost complete conversion of the monomers. The reaction ingredients were fed using measuring devices of the mass type. The reagent mixture (cyclohexane, styrene, butadiene, modifier, consisting of 2-methoxy ethyl tetrahydrofuran, hereinafter indicated by the abbreviation THFA-ethyl and an anti-fouling agent) was prepared in a stirred reactor under nitrogen pressure in sufficient quantity to ensure significant operation, maintaining the composition of the reagents feed constant over time. The initiator (n-butyl lithium in hexane solution) was fed at the inlet to the first reactor. The first polymerisation reactor was of the boiling type; it was not operated completely full and part of the solvent was condensed and recycled in the reactor; control of pressure in the reactor determines the temperature and therefore controls this. All the ingredients were fed from the bottom of the reactor; residence times were varied by varying the feed throughput. A further temperature control is possible through controlling the temperature of the solvent and the monomers entering the first reactor by using heat exchangers.

Under the conditions described above a copolymerisation of butadiene and styrene was performed feeding the solution of monomers containing 7.2% by weight of butadiene and 4.8% by weight of styrene in solution in hexane together with a quantity of THFA-ethyl such as to maintain the ratio between the lithium and the randomising agent within the range 6.2-6.5. The total quantity of reagents and solvents was controlled in such a way that the residence time in the first reactor was 60 minutes. The quantity of n-butyl lithium supplied was 0.024±0.003 g per 100 g of the monomer mixture (hereinafter indicated by the term phm, per hundred monomer), under the conditions described above at the temperature of 92±2° C. A conversion of 75±5% was observed in the first reactor, while in the second reactor the conversion was over 95%. In order to maintain the desired temperature in the second reactor, in which the reactor rate was slower than in the first because of the lower monomer concentration, steam was caused to circulate through the jacket in a suitable quantity to maintain the temperature within the range 57±2° C. In the third reactor, also held at a temperature of 57±2° C., the reaction went to completion and the resulting conversion was over 96%. On leaving the third reactor trimethyl chlorosilane was added to the polymer solution in a quantity of 90% (in moles) of butyl lithium added to terminate the active terminal groups of the copolymer. Using an in-line mixer non-aromatic TDAE oil was added to the polymer solution in a quantity of 27.5±1.5% together with a mixture of antioxidants comprising Irganox® 565 and Irgafos® 168 in a quantity such that their content in the rubber was 0.1 and 0.4% respectively.

The polymer was separated from the solvent by stripping in the current of steam and subsequently mechanically dried using an extruder. Determination of the molecular weight ratio performed using elution chromatography on gel (GPC) provided a $M_n$ of 278,000 and a $M_w/M_n$ of 2.3. IR analysis provided a percentage of 39.9% for the content of 1,2 vinyl units and a styrene content of 41.3%.

Oxidative decomposition of the polymer carried out by analysis through HPLC revealed that styrene blocks were absent.

Conversion was measured by determining the residual monomers in the polymer solution by gas chromatography. The characteristics of the polymer obtained are shown in Table 1.

(B) Linear Styrene-Butadiene Copolymer Extended with Vegetable Oil Derivative: Continuous Preparation The same conditions and the same operating procedures were used as in Example 1 with the only difference that the quantity of butyl lithium was less in order to obtain a high weight average molecular weight and a comparable Mooney viscosity. In this case, with the flow of monomer solvent remaining the same and the same randomised ether ratios, the butyl lithium added was 0.020±0.003 phr together with a quantity of THFA-ethyl such as to maintain the ratio between the lithium and the randomising agent in the range 5.3-5.7. Using an in-line mixer, a vegetable oil derivative belonging to group A1 according to the definition provided in this invention and prepared as described in Example 1 of PCT/EP2011/073492, was added to the polymer solution in a quantity of 27.5±1.5% and a mixture of antioxidants comprising Irganox® 565 and Irgafos® 168 were added in a quantity such that their content in the rubber was 0.1 and 0.4% respectively.

Determination of the molecular weight ratio performed by elution chromatography on gel (GPC) provided a $M_n$ of 368,000 and a $M_w/M_n$ of 2.2. IR provided a percentage of 41.7% for the 1,2 unit content and a styrene content of 40.5%.

Oxidative decomposition of the polymer followed by analysis by HPLC revealed that no styrene blocks were present.

Conversion was measured by determination of the residual monomers in the polymer solution by gas chromatography. The characteristics of the polymer obtained are shown in Table 1.

TABLE 1

| | T (° C.) | THFA-Et/Li | $M_w$ kDalton | $M_w/M_n$ | Styrene % | 1.2 % | Conversion | $T_g$ | $M_L^{(a)}$ | Extender oil |
|---|---|---|---|---|---|---|---|---|---|---|
| A | 92 ± 2 | 6.2-6.5 | 640 | 2.3 | 41.3 | 39.9 | 99.3 | −19.3 | 55 | TDAE |
| B | 92 ± 2 | 6.2-6.5 | 810 | 2.2 | 40.5 | 41.7 | 99.1 | −19.1 | 54 | Vegetable oil der. A1 |

$^{(a)}$Mooney viscosity of the oil-extended polymer (C) Radial Styrene-Butadiene Copolymer (Styrene 38%; 1,2 65%) Extended with TDAE Oil: Batch Preparation The experiment was performed in a batch reactor having a volume of 100 liters fitted with a stirrer and a jacket through which glycolated water was circulated at a temperature that could be varied between 10 and 50° C.; the main purpose of the jacket is to ensure a fixed and reproducible reaction starting temperature. Ingredients were fed to the reaction using measuring devices of the mass type. Cyclohexane (58.5 kg), styrene (2.2 kg) and butadiene (3.65 kg) and randomised ether comprising THFA-ethyl in a quantity such as to maintain the ratio between the lithium and the randomising agent in the range 5.3-5.7 were added to the reactor in that order. The temperature of the reagent mixture was raised to 20° C., by acting on the temperature in the reactor jacket. 40 ml of 5% by weight n-butyl lithium solution in cyclohexane corresponding to 0.0264 phm was added. During the reaction a temperature increase of approximately 50° C. was observed due to the heat of reaction being only partly removed by heat exchange. After 30 min a further 200 g of butadiene and then 17 ml of a 5% by weight solution of $SiCl_4$ were added. After waiting 10 min for completion of the coupling reaction the solution containing the styrene-butadiene copolymer was discharged into a blend to which non-aromatic TDAE oil was added to the polymer solution in a quantity of 27.5±0.5% together with an antioxidant mixture comprising Irganox® 565 and Irgafos® 168 in a quantity such that their content in the rubber was 0.1 and 0.4% respectively.

The polymer was separated from the solvent stripping in a flow of steam and subsequently dried mechanically. The molecular weight ratio was measured by elution chromatography on gel (GPC); the molecular weight of the uncoupled branch was 298 kD, the coupling efficiency was 79%, the structure predominantly radial with a degree of branching in the coupled part very close to 4. IR analysis provided a percentage of 65.7% for the content of 1, 2 units and a styrene content of 37.5%. The characteristics of the polymer obtained are shown in Table 2.

(D) Radial Styrene-Butadiene Copolymer (Styrene 38%; 1,2 65%) Extended with Vegetable Oil Derivative: Batch Preparation In the same way as in Comparative Example 5 a quantity of 5% by weight of n-butyl lithium in cyclohexane corresponding to 0.0233 phm were added. After 30 min a further 200 g of butadiene and then 15 ml of a 5% solution by weight of $SiCl_4$ were added. After waiting 10 min for completion of the coupling reaction the solution containing the styrene-butadiene copolymer was discharged into a blend to which a vegetable oil derivative belonging to group A1 according to the definition provided in this invention was added to the polymer solution in a quantity of 27.5±0.5% together with a mixture of antioxidants comprising Irganox® 565 and Irgafos® 168 in a quantity such that their content in the rubber was 0.1 and 0.4% respectively.

The polymer was separated from the solvent by stripping in a flow of steam and subsequently dried mechanically. Molecular weight distribution was determined by elution chromatography on gel (GPC); the molecular weight of the uncoupled branch ($M_{p\ uncoupled}$) was 348 kD, the coupling efficiency ($W_c$) 77%, the structure predominantly radial with a degree of branching in the coupled part very close to 4. IR analysis provided a percentage of 65.2% for the 1,2 units and a styrene content of 38%. The characteristics of the polymer obtained are shown in Table 2.

TABLE 2

| | $M_{p\ uncoupled}$ kDalton | Wc (%) | Styrene (%) | 1.2 (%) | $T_g$ | $M_L^{(a)}$ | Extender oil |
|---|---|---|---|---|---|---|---|
| C | 298 | 79 | 37.5 | 65.7 | −2.9 | 53 | TDAE |
| D | 348 | 77 | 38.0 | 65.2 | −2.7 | 55 | Vegetable oil der. A1. |

$^{(a)}$Mooney viscosity of the oil-extended polymer

Preparation of the Elastomer Compositions

Using styrene-butadiene copolymers A, B, C and D prepared as above, the properties of which are shown in Tables 1 and 2, technical mixtures were prepared using the recipes shown in Table 3.

TABLE 3

| Composition | Quantity (phr) |
|---|---|
| Styrene-butadiene (A, B, C and D) | 103 |
| High-cis polybutadiene (1.4-cis >96%), Mooney viscosity 40 | 25 |
| Carbon Black N330 | 25 |
| Ultrasil 7000 + Biofiller (MATER-BI 2030/3040) | 80 |
| MES oil | 5 |
| Coupling agent Si75 Bis(triethoxysilylpropyl)polysulfide | 6.7 |
| ZnO | 2.5 |
| Santoflex 13 (1-N-(4-methylpentan-2-yl)-4-N-phenylbenzene-1,4-diamine) | 2 |
| Stearic acid | 1.5 |
| Paraffin wax | 1.5 |
| Sulfur | 1.4 |
| CBS (N-cyclohexyl-2-benzothiazole sulfenamide) | 1.7 |
| DPG (diphenyl guanidine) | 2 |

Maintaining the sum of silica (Ultrasil 7000)+Biofiller (MATER-BI 2030/3040) equal to 80 phr, in the examples the proportions between the two components were varied as shown Table 4 below:

TABLE 4

| | Copolymer | Ultrasil 7000 (phr) | MATER-BI 2030/3040 (phr) |
|---|---|---|---|
| Comparative example 1 | A | 80 | — |
| Comparative example 2 | A | 64 | 16 |
| Comparative example 3 | A | 59.2 | 20.8 |
| Comparative example 4 | B | 80 | — |
| Example 5 | B | 64 | 16 |
| Example 6 | B | 59.2 | 20.8 |
| Comparative example 7 | C | 80 | — |
| Comparative example 8 | C | 64 | 16 |
| Comparative example 9 | D | 80 | — |
| Example 10 | D | 64 | 16 |

The various ingredients were mixed in a Braebender mixer having a 350 cc chamber and Banbury type rotors at a starting temperature of 80° C. and a discharge temperature (6 minutes of the mixing cycle) of 154-158° C. for mixtures with silica alone (Comparative examples 1, 4, 7 and 9), while for the mixtures containing biofiller (Comparative examples 2-3 and 8, Examples 5-6 and 10) the starting temperature of 110° C. was used so as to make it possible to achieve a final temperature of between 162 and 168° C. An accelerant was added to the open mixer, and homogenisation followed for a total of 6 minutes.

The vulcanisation process was performed by pressing the test coupons at 151° C. for 40 minutes.

The properties of the vulcanised products are summarised in Tables 5 and 6.

TABLE 5

| | Comparative example 1 | Comparative example 2 | Comparative example 3 | Comparative example 4 | Example 5 | Example 6 |
|---|---|---|---|---|---|---|
| ML (1 + 4) mixture at 100° C. | 70 | 61 | 57 | 68.5 | 61 | 58 |
| RPA M.D.R 165° C. 40 min | | | | | | |
| TS1 (m · m) | 1.0 | 0.8 | 0.9 | 0.9 | 0.8 | 0.8 |
| TS2 (m:m) | 1.7 | 1.1 | 1.2 | 1.6 | 1.5 | 1.5 |
| T90 (m · m) | 11.9 | 14.8 | 16.7 | 12.0 | 12.5 | 12.8 |
| ML (dNm) | 3.1 | 2.4 | 1.9 | 2.9 | 2.5 | 2.4 |
| MH (dNm) | 16.6 | 15.3 | 14.7 | 15.7 | 15.0 | 14.9 |

TABLE 5-continued

|  | Comparative example 1 | Comparative example 2 | Comparative example 3 | Comparative example 4 | Example 5 | Example 6 |
|---|---|---|---|---|---|---|
| MECHANICAL PROP. ASTM D412C | | | | | | |
| M 100% (MPa) | 2.5 | 3.1 | 3.0 | 2.3 | 2.7 | 2.6 |
| M 200% (MPa) | 6.3 | 8.1 | 8.0 | 6.2 | 7.7 | 7.9 |
| M 300% (MPa) | 12.2 | 13.7 | 13.1 | 11.5 | 12.6 | 12.5 |
| T.S. (MPa) | 20.1 | 19.4 | 18.9 | 19.9 | 20.3 | 20.2 |
| E.B.(%) | 420 | 367 | 360 | 425 | 425 | 435 |
| shore A 3" | 61 | 61 | 58 | 61 | 58 | 57 |
| density | 1.166 | 1.147 | 1.141 | 1.169 | 1.147 | 1.141 |
| Tear Resistance (N/mm) | 43 | 44 | 45 | 48 | 49 | 50 |
| R.R. predictor index | 100 | 106 | 112 | 106 | 113 | 115 |

TABLE 6

| Formulation | Comparative example 7 | Comparative example 8 | Comparative example 9 | Example 10 |
|---|---|---|---|---|
| ML (1 + 4) mixture at 100° C. | 84 | 78 | 85 | 74 |
| RPA M.D.R 165° C. 40' | | | | |
| TS1 (m · m) | 0.9 | 0.8 | 0.5 | 0.4 |
| TS2 (m:m) | 1.1 | 1.0 | 0.7 | 0.5 |
| T90 (m · m) | 18.7 | 17.5 | 16.15 | 15.7 |
| ML (dNm) | 2.9 | 2.6 | 3.5 | 3.2 |
| MH (dNm) | 15.7 | 14.4 | 17.5 | 16.5 |
| MECHANICAL PROP. ASTM D412C | | | | |
| M 100% (MPa) | 2.1 | 2.4 | 2.6 | 3.2 |
| M 200% (MPa) | 5.9 | 6.1 | 7.5 | 8.4 |
| M 300% (MPa) | 11.2 | 11.9 | 14.0 | 14.9 |
| T.S. (MPa) | 19.2 | 19.4 | 20.3 | 20.8 |
| E.B. (%) | 458 | 462 | 455 | 460 |
| shore A 3" | 60 | 59 | 64 | 63 |
| Density | 1.164 | 1.143 | 1.162 | 1.142 |
| Tear resistance (N/mm) | 48 | 49 | 51 | 53 |
| R.R. predictor index | 100 | 105 | 111 | 117 |

The invention claimed is:

1. An elastomeric composition comprising at least one elastomer, at least one derivative of a vegetable oil (A), at least one biofiller of plant origin (B) and at least one coupling agent (C), in which (A) is selected from one or more of the following groups:
A1) mixtures of triglycerides obtained from a vegetable oil comprising one or more of the following oligomeric structures:

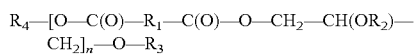

wherein
$R_1$ is selected from $C_2$-$C_{22}$ alkylenes,
$R_2$ is selected from one or more of the following groups consisting of C6-$C_{24}$ dicarboxylic acid residues esterified with monoalcohols and $C_6$-$C_{24}$ monocarboxylic acid residues,
$R_3$ is selected from one or more of the following groups consisting of H, $C_6$-$C_{24}$ dicarboxylic acid residues esterified with monoalcohols and $C_6$-$C_{24}$ monocarboxylic acid residues,
$R_4$ is an alkyl group,
n is an integer equal to or greater than 2,
said mixtures of triglycerides having a Number Average Molecular Weight (Mn) of between 800 and 10,000 Da,
A2) triglycerides of one or more carboxylic acids comprising at least one carboxylic acid containing vicinal hydroxyl groups;
A3) polyol esters with at least one $C_6$-$C_{24}$ monocarboxylic acid and at least one $C_6$-$C_{24}$ dicarboxylic acid, said esters being different from said triglycerides (B) comprises starch complexed with a polymer containing a hydrophilic group intercalated with a hydrophobic sequence and present in a quantity of between 1 and 50 parts per 100 parts of elastomer, wherein said polymer containing a hydrophilic group intercalated with a hydrophobic sequence in the biofiller (B) is selected from:
copolymers of ethylene with vinyl alcohol, vinyl acetate, acrylic acid, methacrylic acid, crotonic acid, itaconic acid, maleic anhydride, glycidyl methacrylate and mixtures thereof;
vinyl acetate/vinyl alcohol copolymers;
6-6, 6-9 or 12 aliphatic polyamides, aliphatic polyurethanes, aliphatic and aliphatic/aromatic polyesters, random and block polyurethane/polyamide, polyurethane/polyether, polyurethane/polyester, polyamide/polyester, polyamide/polyether, polyester/polyether, polyurea/polyester and polyurea/polyether copolymers, polylactic acid, polyglycolic acid, polycaprolactone/urethane wherein the molecular weight of the polycaprolactone blocks lies between 300 and 3000;

(C) comprises organosilane.

2. The elastomeric composition according to claim 1, wherein said elastomer is a natural rubber or a synthetic rubber.

3. The elastomeric composition according to claim 2, wherein said elastomer is a synthetic rubber selected from the group comprising diene-based rubbers, thermoplastic elastomers, nitrile rubbers, acrylonitrile-butadiene copolymers and styrene-isoprene-styrene rubbers.

4. The elastomeric composition according to claim 3, wherein said elastomer is a diene-based rubber.

5. The elastomeric composition according to claim 4, wherein said diene-based rubber is a vinylarene-conjugated diene copolymer.

6. The elastomeric composition according to claim 1, wherein the R1 group of the vegetable oil derivative in group A1 is a $C_6$-$C_{11}$ alkylene.

7. The elastomeric composition according to claim 1, wherein the $C_6$-$C_{24}$ dicarboxylic acid residues of $R_2$ and $R_3$ are suberic acid, azelaic acid and brassilic acid and their mixtures.

8. The elastomeric composition according to claim 1, wherein the $R_4$ group of the vegetable oil derivative in group A1 is a $C_1$-$C_{12}$ alkyl group.

9. The elastomeric composition according to claim 1, wherein the vegetable oil derivative in group A1 comprises dimer and/or trimer ester of a triglyceride containing a $C_6$-$C_{24}$ dicarboxylic acid residue.

10. The elastomeric composition according to claim 1, wherein the vegetable oil derivative belongs to group A1.

11. The elastomeric composition according to claim 1, wherein the vegetable oil derivative is used in a mixture with a mineral and/or natural oil.

12. The elastomeric composition according to claim 1, wherein said polymer containing a hydrophilic group intercalated with a hydrophobic sequence of the biofiller (B) is an ethylene copolymer with vinyl alcohol and acrylic acid.

13. The elastomeric composition according to claim 1 comprising one or more of the following ingredients: inert fillers, reinforcing fillers, vulcanising agents, accelerators, activators, vulcanisation retardants, organic acids, antioxidants, reinforcing materials, process coadjuvants.

14. The elastomeric composition according to claim 13, wherein said reinforcing fillers are carbon black or silica.

15. The elastomeric composition according to claim 1 comprising, considering the total parts of elastomers (a1)+(a2) equal to 100:
(a1) from 30 to 90% by weight of a random vinylarene-conjugated diene elastomer copolymer;
(a2) from 10 to 70% by weight of one or more diene rubbers;
(b) from 10 to 150 phr of silica;
(c) from 1 to 50 phr of a biofiller of plant origin comprising starch complexed with a polymer containing a hydrophilic group intercalated with a hydrophobic sequence;
(d) from 1 to 50 phr of an extender oil comprising a vegetable oil derivative comprising one or more of:
A1) a mixture of triglycerides obtained from vegetable oils comprising one or more of the following oligomeric structures:

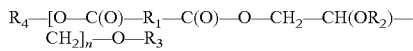

in which
$R_1$ is selected from $C_2$-$C_{22}$ alkylenes,
$R_2$ is selected from one or more of the following groups consisting of $C_6$-$C_{24}$ dicarboxylic acid residues esterified with monoalcohols and $C_6$-$C_{24}$ monocarboxylic acid residues,
$R_3$ is selected from one or more of the following groups consisting of H, $C_6$-$C_{24}$ dicarboxylic acid residues esterified with monoalcohols and $C_6$-$C_{24}$ monocarboxylic acid residues,
$R_4$ is an alkyl group,
n is an integer equal to or greater than 2,
said mixtures of triglycerides having a Number Average Molecular Weight (Mn) of between 800 and 10,000 Da,
A2) triglycerides of one or more carboxylic acids comprising at least one carboxylic acid containing vicinal hydroxyl groups;
A3) polyol esters having at least one $C_6$-$C_{24}$ monocarboxylic acid and at least one $C_6$-$C_{24}$ dicarboxylic acid, the said esters being different from the triglycerides;
(e) from 1 to 20 phr of a silane-based coupling agent;
(f) from 0.1 to 10 phr of a vulcanising agent.

16. A vulcanised product prepared from the elastomeric composition according to claim 1.

17. A method for the production of a tyre which comprises obtaining an elastomeric composition according to claim 1, employing said elastomeric composition in the construction of a tyre and vulcanizing said elastomeric composition.

18. The elastomeric composition according to claim 2, wherein the R1 group of the vegetable oil derivative in group A1 is a $C_6$-$C_{11}$ alkylene.

19. The elastomeric composition according to claim 3, wherein the R1 group of the vegetable oil derivative in group A1 is a $C_6$-$C_{11}$ alkylene.

* * * * *